United States Patent [19]

Pentecost

[11] 3,719,883

[45] March 6, 1973

[54] MAGNETIC CORE CIRCUIT FOR TESTING ELECTRICAL SHORT CIRCUITS BETWEEN LEADS OF A MULTI-LEAD CIRCUIT PACKAGE

[75] Inventor: Eugene E. Pentecost, Anaheim, Calif.

[73] Assignee: North American Rockwell Corporation, El Segundo, Calif.

[22] Filed: Sept. 28, 1970

[21] Appl. No.: 76,079

[52] U.S. Cl. ....................................324/51, 336/212
[51] Int. Cl. ............................................G01r 31/02
[58] Field of Search ............324/51, 52, 127; 317/27; 340/253; 174/52 S; 336/212

[56] References Cited

UNITED STATES PATENTS

| | | | |
|---|---|---|---|
| 2,825,892 | 3/1958 | Duinker | 336/212 X |
| 3,484,533 | 12/1969 | Kauffman | 174/52 S |
| 3,550,099 | 12/1970 | Stein | 336/212 X |
| 2,788,486 | 4/1957 | Guggi | 324/51 |
| 1,743,318 | 1/1930 | Carrington | 324/52 |
| 3,300,650 | 1/1967 | Daien | 317/27 |
| 3,493,839 | 2/1970 | DePuy | 340/253 E X |

*Primary Examiner*—Gerard R. Strecker
*Attorney*—L. Lee Humphries and H. Fredrick Hamann

[57] ABSTRACT

A voltage is induced in at least one lead of a multi-lead package for an electronic circuit by one or more excitation cores disposed around one or more leads of the package. The leads are connected together at one end by the lead frame. The opposite ends of the leads are secured to a housing for the electronic circuit. One or more detection cores, disposed around one or more leads of the package and suitably spaced from the excitation cores, detect current in the lead circuit encompassed by the excitation and detection cores. A relatively high voltage is induced in the detection cores if a short circuit exists in the encompassed lead circuit while a relatively low voltage is induced in the detection cores if an open circuit is detected.

3 Claims, 5 Drawing Figures

INVENTOR.
EUGENE E. PENTECOST
BY Robert G. Rogers
ATTORNEY

INVENTOR.
EUGENE E. PENTECOST
BY Robert G. Rogers
ATTORNEY

INVENTOR.
EUGENE E. PENTECOST

BY Robert G. Rogers

ATTORNEY

MAGNETIC CORE CIRCUIT FOR TESTING ELECTRICAL SHORT CIRCUITS BETWEEN LEADS OF A MULTI-LEAD CIRCUIT PACKAGE

BACKGROUND OF THE INVENTION

1. Field of the Invention

The invention relates to an electrical short detector for a multilead package and more particularly to such a detector using excitation cores for inducing a voltage in one or more leads of the package and detection cores for detecting a voltage indicating an electrical short between leads of the package within the circuit of the cores.

2. Description of Prior Art

Microelectronic circuits usually require a package for protection and assembly to a circuit board. Such packages are sometimes referred to as "flat-packs", or "flat lead packages". U.S. Pat. No. 3,484,533, for "A Method for Fabricating Semiconductor Package and Resulting Article of Manufacture" by John E. Kaufman, issued Dec. 16, 1969, and U.S. Pat. application, Ser. No. 803,903, filed Mar. 3,1969, for "A Flat Electronic Package Assembly" by David Nixen et al, illustrate examples of flat-lead packages.

Because of the relatively miniaturized size of the package, the spacing between the leads is substantially reduced, particularly at the central area of the housing where the microelectronic circuit is encapsulated. For example, the lead terminations at the central area of the housing may have a spacing on the order of .01 inches. As a result, during the manufacturing process, metal plating, soldering strips, deformed leads, etc. may cause a short circuit between adjacent leads of the package. The short circuit may be concealed by the housing structure. As a result, the defect in the package may not be detected until after the leads have been severed from the frame when the microelectronic circuit encapsulated by the package is being electrically tested. A large scale integrated circuit is one example of a microelectronic circuit which can be housed by the package.

A testing system is desired which can detect short circuits before the electrical test is undertaken and before the leads have been sheared from the lead frame. Such a system would enable the package to be reworked or discarded without the necessity for additional time consuming and extensive processing. The present invention provides such a system.

SUMMARY OF THE INVENTION

Briefly, the invention comprises excitation core means disposed around one or more leads of a multilead package for an electronic circuit where the leads are secured to a frame. Detection core means, suitably spaced from the excitation core means are disposed around one or more leads of the multi-lead package for detecting short circuits between leads encompassed by the excitation and detection core means. If a short circuit is detected, a relatively large voltage is induced in the detection core means, conversely, when the electrical circuit of the package leads encompassed by the detection and excitation core means is open (i.e. not shorted), a relatively small voltage is induced in the detection core means.

In one embodiment, the excitation core means comprises a plurality of wire wound cores which are simultaneously disposed around all the leads of the package on both sides of the housing. Similarly, the detection core means comprises a plurality of wire wound cores spaced apart from the excitation cores and disposed around all the leads of the package on both sides of the housing. In that manner, the electrical circuits between all of the leads are tested for electrical shorts simultaneously.

In another embodiment, single wire wound excitation detection cores are systematically moved from one lead to an adjacent lead for testing short circuits between each adjacent lead of the package. The latter embodiment has the advantage of fewer cores but suffers the disadvantage of speed and additional apparatus required to incrementally move and reposition the core means about each lead of the package.

In both embodiments, one or more meters such as voltage meters, can be used to indicate the presence of an electrical short. The input voltage to the excitation core means may be provided by an amplifier energized by a test signal.

Therefore, it is an object of this invention to provide an improved electrical short detector for a multi-lead package.

It is another object of this invention to provide an electrical short detector for a multi-lead package using excitation core means and detection core means suitably positioned about one or more leads of a multilead package for detecting short circuits between the leads of the package.

Another object of this invention is to provide an improved process for detecting electrical short circuits between leads of a multi-lead package by using excitation core means and detection core means spaced apart about leads of the multi-lead package.

A still further object of this invention is to provide an improved testing system for multi-lead packages comprising at least one wire wound excitation core which can be positioned about one ore more leads of a multilead package and at least one wire wound detection core which can be positioned about one or more leads of a multi-lead package in synchronism with the positioning of the excitation core for either simultaneously testing the complete package for electrical shorts or for incrementally testing the multi-lead package for electrical short circuits.

A still further object of this invention is to provide a continuity tester for a multi-lead package comprising positionable wire wound cores which enable the package to be tested without severing the leads from the lead frame.

A still further object of this invention is to provide an improved electrical short detector for a multi-lead package which enables the package to be reworked or discarded without extensive electrical tests before the leads of the flat-lead package including a frame, are severed from the lead frame.

These and other objects of this invention will become more apparent when taken in connection with the description of the drawings, a brief description of which follows:

DESCRIPTION OF PREFERRED EMBODIMENTS

Figure 1:
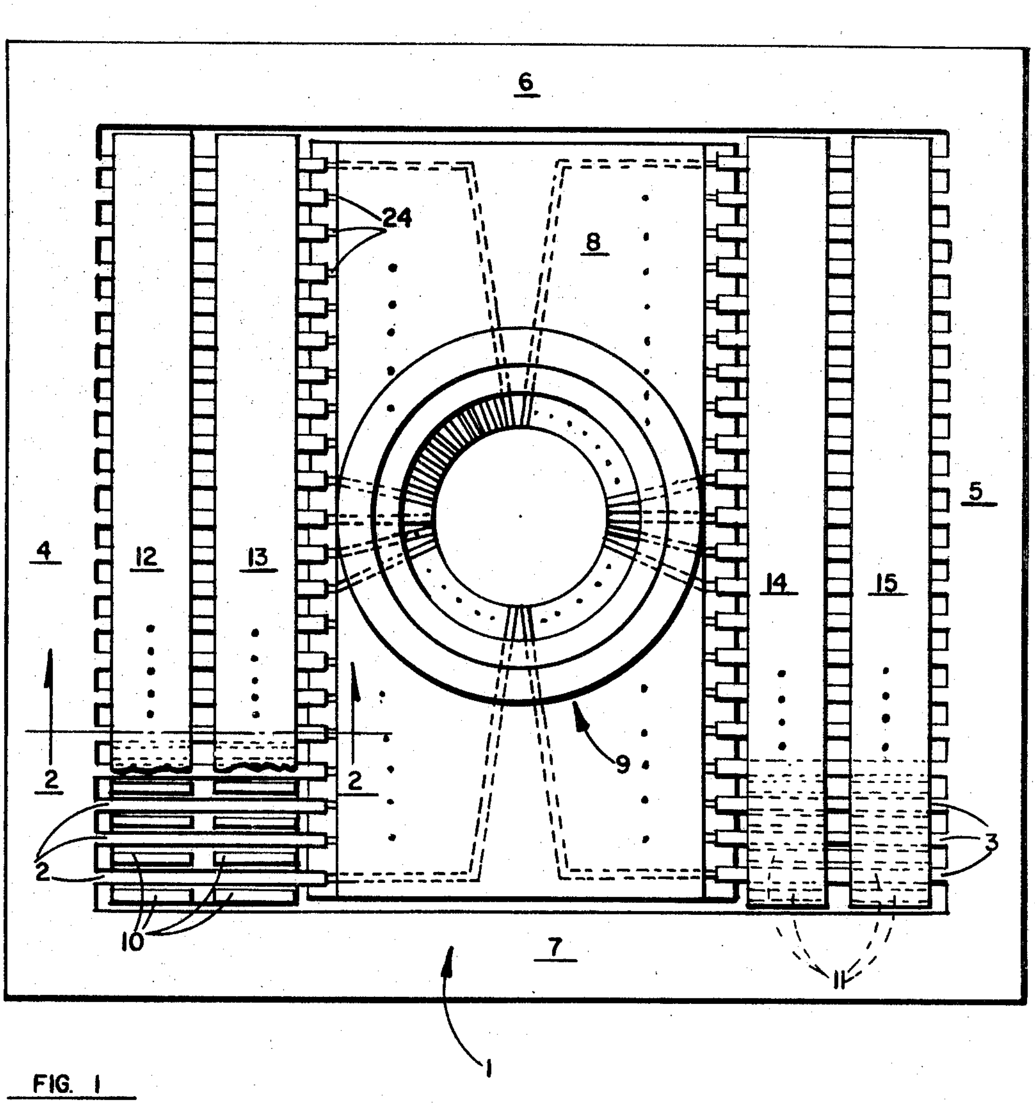
FIG. 1 is a top view, partially broken away, of a flat-lead package showing the leads of the package connected to the lead frame and showing one embodiment of a detector of electrical short circuits between leads of the package.

FIG. 1 is a top view of a flat-lead package 1 including parallel and inwardly extending leads 2 and 3 integrally formed with the lead frame edges 4 and 5 of package 1. Lead frame edges 6 and 7 complete the lead frame for package 1. The terminations of the leads 2 and 3 are secured to the housing 8 of the package 1 about the periphery of the housing. The housing 8 includes a circuit pattern (not shown) which is protected by an upper cover. The portions of the circuit pattern designated by numeral 24 connect the lead terminations to the microelectronic circuit encapsulated within the central area 9 of the housing 8.

The housing 8 may be comprised of laminated ceramic layers on which a circuit pattern has been formed on one or both of the inner surfaces of the laminations. Such packages are described in more detail in the previously referenced patent application. For that reason additional details are not given herein.

The terminations of the leads 2 and 3 are suitably bonded to the circuit terminations 24 about the periphery of the housing 8. The conductors may be comprised of any suitable conducting metal such as a nickel-iron alloy. In certain embodiments, gold may be plated over the nickel-iron alloy. Another example of a flat-lead package including process details for producing the package can be found in a patent application entitled "Plastic Package Assemblies for Electronic Circuit and Process for Producing the Package," filed on or about Aug. 10, 1970 by David Nixen et al.

FIG. 1 also shows lower core member 10 comprising a plurality of integrally connected members having a comb-like structure. The lower half of the core can be produced from a ferrite material. The lower member 10 is used as the lower half of the excitation and detection cores as described in more detail in connection with FIG. 2. An identical lower core member 11 is shown on the opposite side of the housing 8 for leads 3.

In addition, FIG. 1 shows the upper core members 12 and 15 disposed on the flat top surfaces of the raised ridges of the lower members 10 and 11 for completing the magnetic path for the excitation cores. Upper core members 13 and 14 are disposed on the remaining raised ridges for completing the magnetic path for the detection cores. The upper core members 12 through 15 may also be comprised of a flat longitudinally extending bar of ferrite material. It should be obvious that equivalent materials could also be used to implement the upper and lower members of the excitation and detection cores. For convenience, the wiring for the cores including input and output circuits have been left off FIG. 1.

Figure 2:
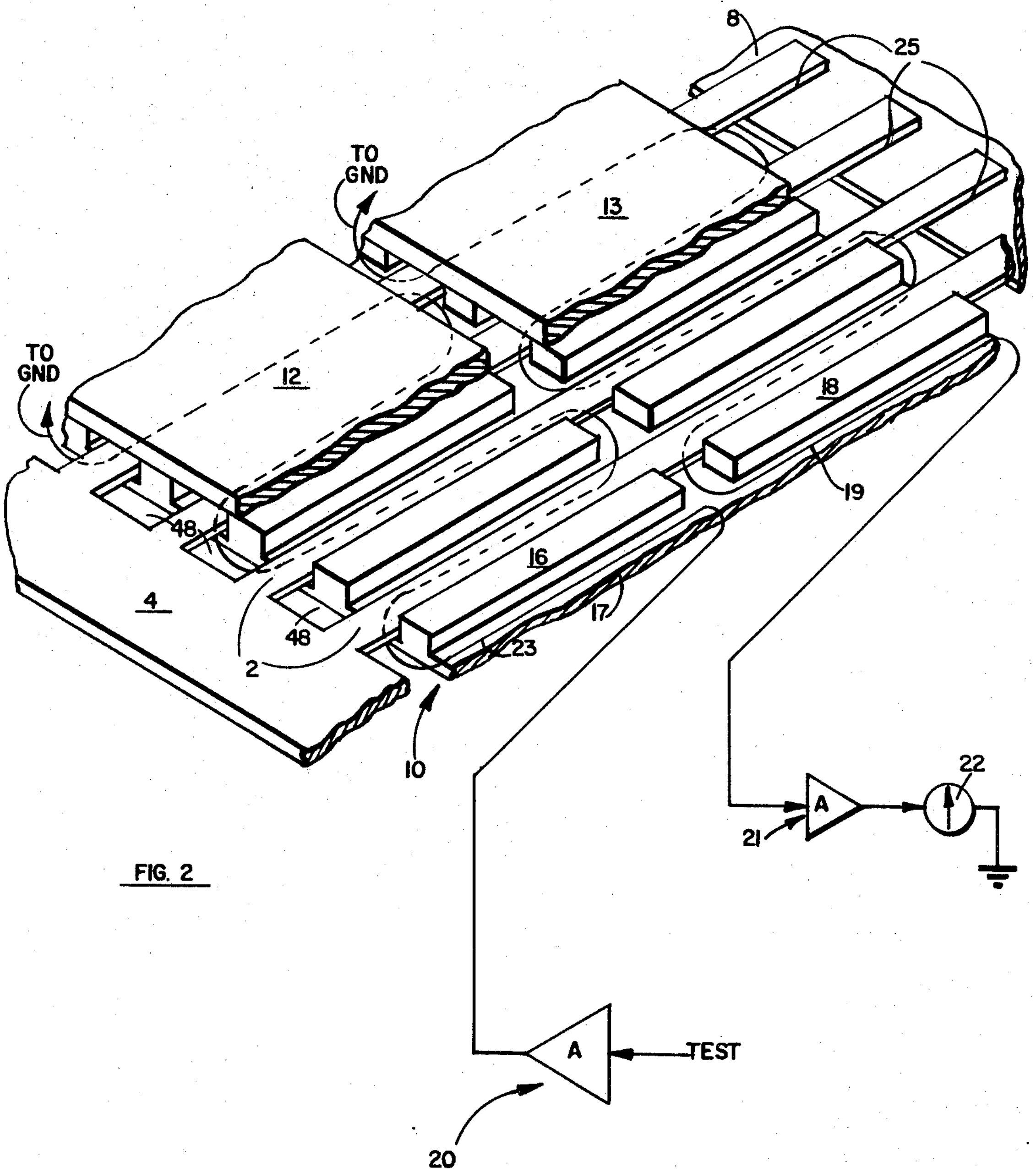
FIG. 2 is a perspective view of the FIG. 1 embodiment taken along line 2—2 of FIG. 1 and showing more details of the excitation and detection cores of the FIG. 1 embodiment including a source of excitation voltage and means for measuring the detected voltage induced in the detection cores.

FIG. 2 is a perspective view of the FIG. 1 embodiment taken along line 2—2. The FIG. 2 embodiment illustrates leads 2 which are integrally connected between the lead frame edge 4 and housing 8. The connection of the leads 2 to the housing is identified by the numeral 25. The spacing or separation between the leads 2 is identified by the numeral 48.

The magnetic structure for lower member 10 comprises a base 17 for both the detection and excitation cores and raised ridges 16 and 18 which insert in the open spaces 48 between the leads 2. The raised ridges 16 and 18 have dimensions that enable them to easily fit in the open spaces 48 and to extend beyond the thickness of the leads 2.

The magnetic bars implementing upper core members 12 and 13 of the excitation and detection cores, respectively, are also shown disposed on the flat surfaces of raised ridges 16 and 18 for completing the magnetic path about each of the leads 2. In effect, the excitation core unit comprises a plurality of raised ridges 16 having a common base 17 and a common upper core member 12. Electrically, the structure provides a magnetic excitation core about each of the leads 2.

Similarly, the detection core unit also includes the common base 17, raised ridges 18 and common upper member 13. Electrically, a magnetic detection core is provided about each of the leads 2 of the package.

The excitation windings for each core are identified by a single wire designated by the numeral 23. The wire extends around each of the raised ridges 16 under the leads 2 and is connected to a suitable reference potential ground at one end as indicated in the figure. Similarly, the winding for the detection cores is identified by the numeral 19. The detection core winding is wound around each of the raised ridges 18 and is also connected to electrical ground or other suitable reference potential.

The input to the excitation winding 23 is provided by amplifier 20 which receives the test input signal from, for example, an alternating voltage supply as may be required for a particular application.

The detection winding 19, is connected as an input to amplifier 21. The detector voltage is amplified for causing a deflection on meter 22 which may be a volt meter for indicating the voltage detected by the detection cores. One end of the volt meter is connected to a suitable reference potential such as electrical ground. In certain applications, the amplifiers 20 and 21 may be omitted if meter 22 has the required sensitivity and the test voltage source has a suitable amplitude and impedance match with the excitation winding.

In operation, after a multi-lead package has been produced the assembly is tested for short circuits. The package is either lowered over the lower core member 10 or the package is secured and the lower core member 10 is raised so that raised ridges 16 and 18 protrude between the leads 2 of the package in openings 48. After the package and lower core member 10 (and the opposite core member 11 — see FIG. 1)

have been positioned relative to each other as shown in FIG. 2, the upper core members 12 and 13 as well as the upper core members 14 and 15 for the opposite side of the package (see FIG. 1) are positioned on top of the ridges 16 and 18 (and the opposite side counter- (or bottom) parts). It is necessary that the top surfaces of ridges 16 and 18 be relatively flat and that the inside surfaces of members 12 and 13 also have a high degree of flatness for making good contact with the raised ridges 16 and 18 in order to provide a good magnetic circuit path.

When the upper members 12 and 13 have been properly positioned on the ridges 16 and 18 of lower member 10, the excitation winding 23 is energized. A voltage (TEST) may be provided by closing a test switch (not shown) which connects a voltage to amplifier 20. The output signal from amplifier 20 energizes winding 23 which produces a magnetic field in the cores comprising ridges 16, base 17 and upper member 12 enclosing each of the leads 2 of the package. In a practical embodiment, the excitation cores may each be wound with one turn of wire 23 where the core material is ferrite. In that case, a 1 volt RMS excitation voltage having a frequency of 1MHz may be used to excite the excitation cores and induce a current in the leads 2.

The ridges 16 and 18 and members 12 and 13 are suitably spaced from each other so that there is no coupling directly between the excitation and detection cores. Otherwise, the detected voltage may be in error.

For the example given, it is assumed that the detection cores are each wound by a one turn of wire 19 and that ferrite is used as the magnetic core material. For that embodiment, with 1 volt at 1MHz on the excitation winding, a relatively large voltage (e.g. 15 mV) is induced in the detection winding 19 when a short circuit exists between any of the leads 2 in the electrical circuits encompassed by the detection and excitation cores. When no short circuit exists, i.e. when all of the circuits are electrically open, a relatively smaller, quite stable voltage (e.g. 0.5 mV) is induced in the detection windings. That is, when a short circuit exists, current flow is induced in the shorted leads 2, which current produces a relatively large signal in winding 19 via detector cores 18. Conversely, in the absence of a short circuit, there is no current flow in leads 2 whereby little or no signal is produced in winding 19.

It is pointed out that although FIG. 2 shows a plurality of excitation and detection cores for each of the leads 2 and each of the leads 3 on opposite side of the package (not shown), a smaller number of cores can also be used to implement an embodiment. In that case it would be necessary to either shift the package relative to the cores for each test or shift the cores relative to the package for each test. Alternately a plurality of independent excitation and detection cores can be used for making simultaneous tests. The mechanical apparatus for effecting relative movement between the package and the cores is believed to be within the abilities of a person skilled in the art. For that reason such details are not included herein.

In the event an electrical short is detected, the package can either be discarded or reworked to find the short circuit. In some cases, the lead terminations in the opening can be brushed to remove short circuits between the lead terminations.

Figure 3:
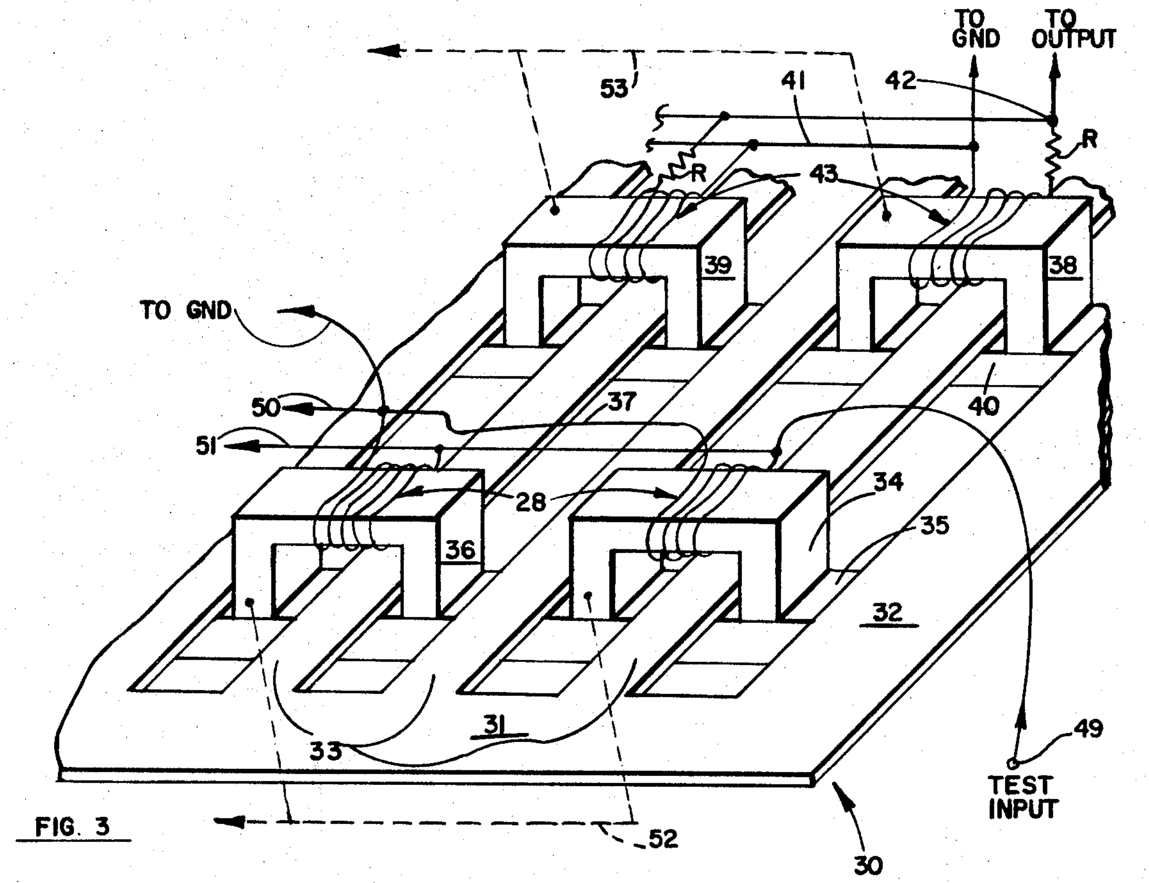
FIG. 3 is a perspective view of a different embodiment of a detector of electrical short circuits between adjacent leads of a multi-lead package including input and output circuits.

FIG. 3 shows a different embodiment of an electrical short detector for a multi-lead package 30. The multi-lead package 30, similar to the package shown in FIG. 1, comprises leads 33 which are integral with frame member 31. Frame 31 is also connected at one edge of the package to frame member 32.

In FIG. 2, each of the plurality of detection and excitation cores were connected in electrical series. In FIG. 3, the detection and excitation cores are connected in electrical parallel. In addition, in the FIG. 2 embodiment, the cores comprised a plurality of, integrally connected, regularly spaced, parallel ridges for both the excitation and detection cores. In the FIG. 3 embodiment, the excitation and detection cores are completely separated.

The excitation cores comprise upper core members 34 and 36 suitably disposed on common core member 35 for completing the magnetic path through the cores around the leads 33. Each of the cores are wire wound by windings identified by the numeral 28. The inputs to the windings on core members 34 and 36 are provided by the test input 49. The inputs to adjacent core members is provided by conductor 51. An arrow at the end of conductor 51 indicates that additional core members may be provided as part of the FIG. 3 embodiment.

It should also be understood that any number of magnetic core could be provided in a practical embodiment. Two cores are shown in FIG. 3 although in other embodiments one or more cores could also be provided. The opposite side of the windings for each of the core members are connected at common point 50 which is connected to electrical ground and to other core windings (if any).

Detection core members 38 and 39 are also suitably disposed around leads 33. Common core member 40 completes the magnetic path around each of the leads. The core members 38 and 39 are suitably wound by windings identified by the numeral 43 which has a common connection to ground via conductor 43. The other ends of the windings are connected together by conductor 42 which is connected to an output such as a volt meter. Resistors R, are connected between each of the detection windings and the common output conductor 42.

Figure 2A:
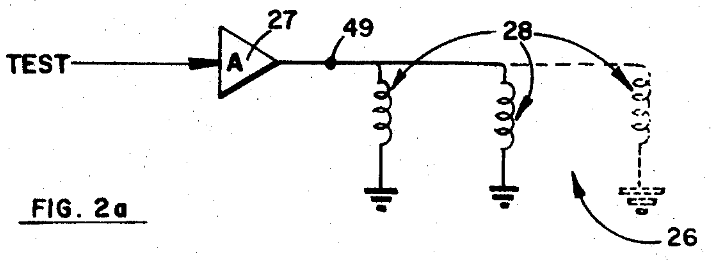
FIG. 2*a* is a schematic diagram representing the excitation circuit of the FIG. 3 embodiment.

FIG. 2*a* is an electrical schematic of the FIG. 3 embodiment showing the excitation windings 28 in electrical parallel. The input point 49 is shown connected to the output of amplifier 27. Each of the windings 28 are shown connected to electrical ground. The complete excitation circuit is identified by a numeral 26.

Figure 2B:
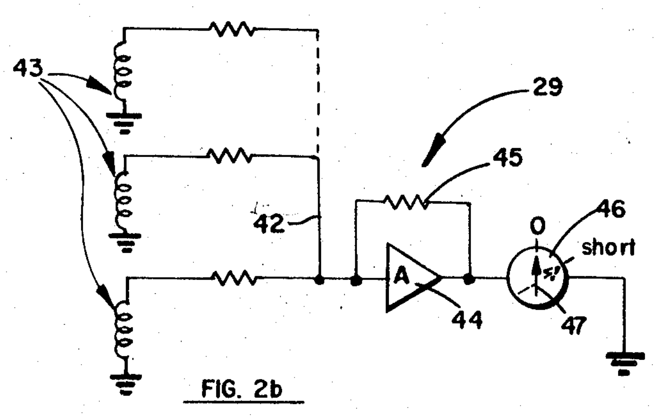
FIG. 2*b* is a schematic diagram representing the detection circuit shown in FIG. 3.

FIG. 2*b* is an electrical schematic of the detection circuit identified by the numeral 29. As indicated in the figure, each of the detection windings is identified by the numeral 43 connected together at a common point which provides an input to amplifier 44 having a feedback resistor 45. The output from amplifier 44 drives volt meter 46 which has a needle 47 for indicating the presence or absence of an electrical short between the leads being tested. The opposite side of the meter 46 is connected to electrical ground.

In operation, an input signal at test input 49 provides an excitation voltage for each of the windings 28. With a voltage such as 1 volt RMS at 1MHz on the excitation windings, a current is induced in the leads 33. The magnitude of the current is dependent upon the presence or absence of an electrical short between adjacent leads 33. If a short circuit exists, the current flow is increased through the circuit which includes the electrical short and which is encompassed by associated excitation and detection cores. A relatively high voltage is therefore induced in the detection winding 43 of a detection core. The increased voltage is provided as an input to amplifier 44 which drives the needle 47 of meter 46 to a position designated as short in FIG. 2b. An actual voltage reading can also be taken if required.

The mechanical means for shifting the cores from one or more leads to other leads, if required for a particular embodiment, has been omitted. It is believed that the apparatus for moving the cores between leads is within the abilities of a person skilled in the art. Mechanical linkages identified by the numeral 52 and 53 are shown to represent the capability for shifting the cores relative to the leads 33 of the package 30.

It is also pointed out that although members 35 and 40 are common to core members 34, 36 and 38, 39, respectively, separate lower core members could be provided. In addition, core configuration other than the configurations shown can also be used for the detection and excitation cores.

In a practical example, each of the cores of the FIG. 3 embodiment are wound with 40 turns of wire such as insulated copper wire. In that case for a 1 volt excitation voltage, approximately 400 millivolts is induced in the detection windings when a short circuit exists and approximately 1 millivolt is induced when an open circuit is detected.

I claim:

1. A device for testing for short circuits between leads of a circuit package having a plurality of closely spaced leads extending therefrom and wherein one end of each of the leads is connected to a common lead frame and the opposite end of each of said leads is connected at a centrally disposed area of the package for being ideally electrically connected to a different circuit point in said centrally disposed area, said device comprising, excitation core means disposable about one or more of said leads of said package, said excitation core means comprising a plurality of cores having upper and lower magnetic core members for encircling leads of said package and completing a first magnetic path around each of the encircled leads, at least one of said upper and lower core members of each excitation core means including a recess in which said leads are disposed, an excitation winding associated with said excitation core means, detection core means disposable about one or more of said leads of said package, said detection core means each comprising a plurality of cores having upper and lower magnetic core members for encircling leads of said package and completing a second magnetic path around each of the encircled leads, at least one of said upper and lower core members of each detection core means including a recess in which said leads are disposed, a detection winding associated with said detection core means, said excitation core means and said detection core means encircling the same leads of said package, and means for applying a signal to said excitation winding associated with said excitation core means in order to produce a signal in the detection winding associated with said detection core means, said signal exhibiting a high or low level as a function of the presence or absence of an electrical short circuit between said opposite ends of any two or more of said leads of said circuit package, which leads are encircled by said excitation core means and said detection core means.

2. The device recited in claim 1 wherein said first common core members of said excitation core means and said detection core means comprise a plurality of raised ridges on a common base, said ridges being positionable in spaces between said leads, and said second common core members of said excitation core means and said detection core means comprise a relatively flat element in contact with the tops of said ridges for completing magnetic paths around said leads.

3. The device recited in claim 2 wherein said raised ridges of said excitation core means and said raised ridges of said detection core means are spaced apart on said common base in order to reduce electromagnetic mutual induction between said excitation core means and said detection core means.

* * * * *